June 2, 1964     J. E. BORAH     3,135,520
MOLDED GASKET WITH FLEXIBLE METAL INSERT
Original Filed Jan. 12, 1960     2 Sheets-Sheet 1
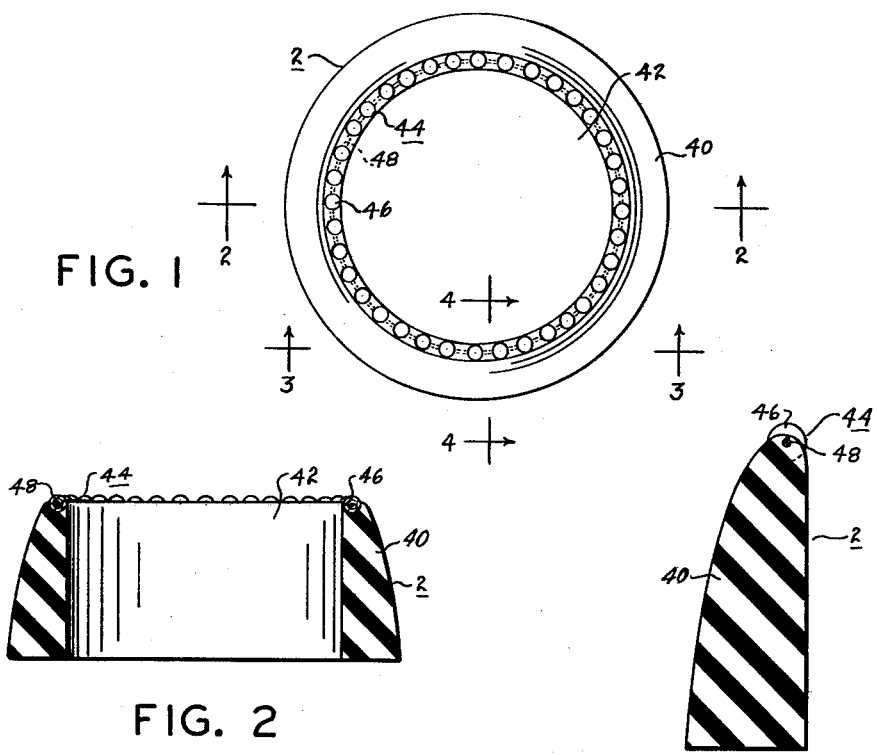
FIG. 1
FIG. 2
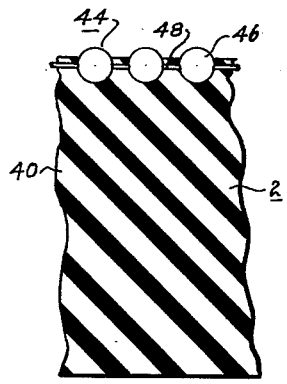
FIG. 3
FIG. 4
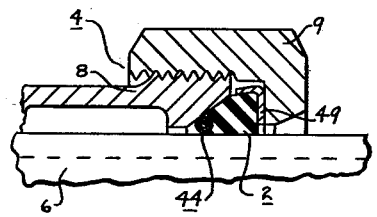
FIG. 5
*INVENTOR.*
JOHN E. BORAH
BY
M. A. Hobbs
ATTORNEY June 2, 1964    J. E. BORAH    3,135,520
MOLDED GASKET WITH FLEXIBLE METAL INSERT
Original Filed Jan. 12, 1960    2 Sheets-Sheet 2

INVENTOR.
JOHN E. BORAH
BY
M. A. Hobbs
ATTORNEY

United States Patent Office 3,135,520
Patented June 2, 1964

3,135,520
MOLDED GASKET WITH FLEXIBLE
METAL INSERT
John E. Borah, 815 Mishawaka Ave., Mishawaka, Ind.
Original application Jan. 12, 1960, Ser. No. 1,924, now Patent No. 3,095,611. Divided and this application Nov. 28, 1960, Ser. No. 72,028
4 Claims. (Cl. 277—235)

The present invention relates to a gasket and more particularly to an annular gasket or rubber-like material having a flexible metal insert embedded therein. The present application is a division of my copending application Serial No. 1,924 filed January 12, 1960, and now Patent No. 3,095,611.

Gaskets used in forming joints in tubes and pipes frequently contain metal inserts for the purpose of forming good electrical connections between the adjoining sections and coupling parts. Various types of metal inserts have been used, including beaded chains and annular shaped coil springs. In order for these inserts to conduct an electrical current effectively between the adjoining pipe sections, it is necessary that they be partially exposed so that metal-to-metal contact will be established between the pipe, insert and fitting. In the past, these inserts, for example the beaded chain type inserts, were exposed intermittently in small areas along the internal and external surfaces and were spaced inwardly from the end of the gasket, often being produced by molding an annularly-shaped gasket of rubber-like material with the beaded chain initially fully embedded in the rubber gasket, and thereafter abrading the gasket to expose at least a portion of the insert along the internal and external surfaces. This fabricating method and final gasket were both unsatisfactory, in that it was virtually impossible to remove the rubber uniformly along the beaded chain or the convolutions of the spring, and only relatively small areas of the chain beads or spring convolutions were exposed on the internal and external surfaces of the gasket, so that a good, dependable metal-to-metal contact between the insert and the pipe and fitting was often not possible. It is therefore one of the principal objects of the present invention to provide a molded gasket of rubber or rubber-like material having molded therein a partially embedded flexible metal insert, a substantial portion of which is exposed at the end of the gasket for producing a reliable metal-to-metal contact between the insert, pipe and fitting, and which is firmly secured to the body portion of the gasket with a portion thereof projecting beyond the end of the body portion.

Another object of the invention is to provide a gasket of rubber or rubber-like material having partially embedded therein an annular beaded chain in which the connecting stems between the bead are fully embedded and the beads are uniformly exposed throughout the circumferential portion of the chain.

Still another object of the invention is to provide a molded annularly-shaped gasket of the aforesaid type in which the beads are initially molded only partially embedded in the rubber or rubber-like material, and the portion of the beads not embedded is fully and uniformly exposed at the respective end of the gasket.

Another object is to provide a gasket having an annular lobed insert with each lobe being uniformly exposed and hardened to bite with maximum efficiency into both the pipe and fitting forming a joint of low resistance, and eliminating the need for conventional bonding.

Further objects and advantages will become apparent from the following description and accompanying drawings, wherein:

FIGURE 1 is an enlarged elevational view of one type of gasket embodying the present invention;

FIGURE 2 is a cross sectional view of the gasket shown in FIGURE 1 taken on line 2—2 of the latter figure;

FIGURE 3 is an enlarged fragmentary cross sectional view of the gasket shown in FIGURES 1 and 2 taken on line 3—3 of FIGURE 1;

FIGURE 4 is an enlarged cross sectional view of the gasket shown in the preceding figures taken on line 4—4 of FIGURE 1;

FIGURE 5 is a fragmentary view of a pipe and fitting with my gasket assembled therebetween;

Figure 6:
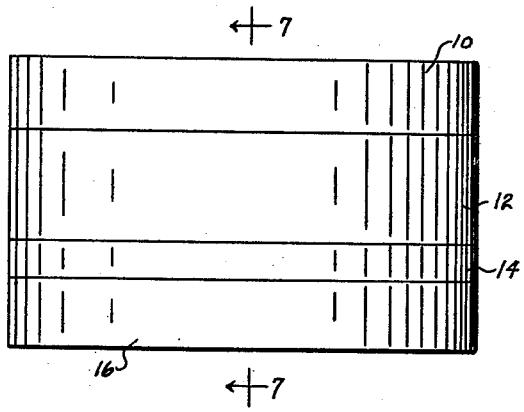
FIGURE 6 is a side elevational view of a mold producing the present gasket, showing the various parts of the mold assembled in operative position.
Figure 7:
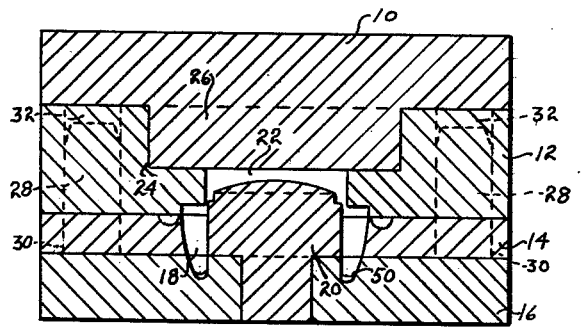
FIGURE 7 is a vertical cross sectional view of the mold taken on line 7—7 of FIGURE 6.

Referring more specifically to the drawings, FIGURES 1 through 5 illustrate a gasket 2 embodying my invention and the manner in which the gasket is assembled in a joint 4 and held in sealing engagement with a pipe 6 and threaded fitting 8 by a nut 9, a partially exposed beaded chain in the gasket forming a good metal-to-metal connection between the pipe and fitting. The method and mold for producing this type of gasket are illustrated in FIGURES 6 through 15, numeral 10 designating the plunger, 12 the pot well, 14 the center plate, and 16 the bottom plate of a transfer mold. Numeral 18 designates the mold cavity, 20 a core insert for forming the hollow interior of the gasket, and 22 the sprue connecting the pot well with the mold cavity. The general construction of the mold may be considered conventional for the purpose of the present description and is adapted to be assembled during the molding operation with moldable material in recess 24 beneath plunger member 26.

The assembled mold montaining moldable material is placed in a suitable press wherein the moldable material is forced by plunger 26 at an elevated temperature through sprue 22 into mold cavity 18. The mold is maintained under pressure and at an elevated temperature for sufficient time to permit the rubber in the cavity to cure. The mold is then removed from the press and the four mold sections separated to remove the gaskets from the cavity around core 20 and to remove the waste material remaining in recess 24 and sprue 22. A plurality of pins 28 secured to bottom plate 16 and extending through holes 30 and 32 in center plate 14 and pot well 12, respectively, assist in aligning during the molding operation. In a production mold, a large number of mold cavities 18, cores 20 and sprues 22 are provided; however, since these parts are identical from one to the other, only the ones shown in the drawings will be described in detail herein.

The present gasket 2 produced by the above described mold and shown in detail in FIGURES 1 through 5, consists of an annular body 40 of rubber or rubber-like material having a substantially cylindrical opening 42 therethrough and an external surface tapering from one end to the other. An endless beaded chain 44 is partially embedded in the small end of the gasket, the rubber normally covering approximately half of each bead, leaving the other half fully exposed and projecting beyond the end of the gasket. The chain consists of a series of hollow beads 46 connected by short wire-like stems 48, and is formed into a complete continuous circle of the size of the small end of the gasket. The exposed portion of each bead presents a continuous surface which readily seats onto adjacent surfaces of the pipe and fitting when a joint is assembled, biting into the metal of these parts and forming a good electrical contact therewith. Nut 9 threaded onto fitting 8 bears against metal backing ring 49 of the gasket, seating the gasket against the tapered end of the fitting and onto the external surface of the pipe.

Figure 8:
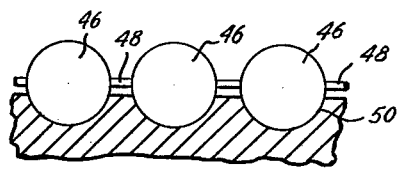
FIGURE 8 is an enlarged fragmentary cross sectional view of the present mold, showing a portion of a beaded chain in place before the molding operation.

In the mold for producing the present gasket, a series of hemispherically shaped recesses 50 are provided in the lower portion of the mold cavity 18 for receiving the beads of the chain when the chain is dropped or inserted in the cavity of the mold preparatory to the molding operation. FIGURE 8 illustrates the manner in which the beaded chain seats in the recesses 50, each bead being in direct contact with the mold portions forming the recesses to the extent of approximately half of the bead or to any desired portion thereof.

After the chain has been assembled in the bottom of the mold with the beads seated in their proper recesses 50, the mold sections are then assembled with the moldable material in recess 24 and the assembled mold is placed in the press wherein plunger member 26 is forced downwardly into recess 24, causing the moldable material to flow through sprue 22 into cavity 18, the fluid rubber completely filling the cavity and surrounding the stems between the beads of the chain and approximately half of each bead of the chain. The downward pressure of the rubber entering the mold cavity seats the beads firmly against the walls defining recesses 50 and prevents the rubber from flowing around the lower side of the beads and thereby prevents the beads from being fully enclosed by rubber. After the mold is maintained under sufficient pressure and temperature to cure the rubber, the press is opened and the mold removed. The sections of the mold are then pried apart or otherwise separated and the gaskets are removed from core 20.

The gaskets on being removed from the mold require very little further processing in order to complete them, in that the beads are properly exposed along the entire end of the gasket and thus require no buffing operation which might damage the beads and rubber gasket portion. Only small flanges or flashes remaining from the sprues and parting surfaces between the mold sections must be removed. This is readily accomplished by tumbling the gaskets in a cylinder containing Dry Ice or other coolant for rendering the flashes sufficiently rigid to break from the gaskets, leaving the surface of the gasket smooth and ready for use.

The present molded gasket is not limited to any particular size or details of shape and may be formed of rubber, rubber-like and plastic materials and contain partially embedded therein a beaded chain, coil spring or other articulated or lobed type structure. Various other changes and modifications may be made without departing from the scope of the present invention.

I claim:
1. A gasket for use between a metallic tube and coupling member comprising a molded annular body portion of elastomeric material, said body portion having an axis and being of uniform cross-section taken normal to said axis at any point therealong, the internal surface of said body portion being so constructed and arranged to embrace the external surface of said tube, the external surface of said body portion being so constructed and arranged to at least partially snugly engage the interior surface of said coupling member, and an annular metal insert consisting of a plurality of spaced apart spherical metal beads connected by wire-like stems, said beads being only partially embedded in said exterior surface of said body portion with the stems between said beads extending only in the circumferential direction of said body portion, said stems being fully embedded in the material of said body portion, the beads having a sufficient portion of their peripheral surfaces substantially uniformly exposed and projecting beyond said external surface of the body portion to engage both the tube and coupling member upon making up of a joint, said material between said beads presenting a smooth, uniformly contoured surface.

2. The gasket defined in claim 1 wherein approximately half of the peripheral surfaces of the beads are uniformly exposed.

3. The gasket defined in claim 1 wherein the beads protrude beyond the respective end of the body portion.

4. The gasket defined in claim 1 wherein the annular body portion is relatively thick at one end and relatively thin at the other end and said insert is disposed in said relatively thin end.

References Cited in the file of this patent
UNITED STATES PATENTS

| | | |
|---|---|---|
| 1,984,806 | Pfefferle | Dec. 18, 1934 |
| 2,463,235 | Andrews | Mar. 1, 1949 |
| 2,561,887 | Risley | July 24, 1951 |
| 2,610,078 | Risley | Sept. 9, 1952 |
| 2,721,091 | Pfefferle | Oct. 18, 1955 |
| 2,747,899 | Wiltse | May 29, 1956 |
| 2,787,479 | Burns | Apr. 2, 1957 |
| 2,945,390 | Bush et al. | July 19, 1960 |
| 3,056,617 | Snoddy | Oct. 2, 1962 |

FOREIGN PATENTS

| | | |
|---|---|---|
| 1,169,444 | France | Sept. 8, 1958 |